US012608989B2

(12) United States Patent
Sinclair et al.

(10) Patent No.: US 12,608,989 B2
(45) Date of Patent: Apr. 21, 2026

(54) MOBILE BADGE FOR ACCESS AUTHORIZATION AT MULTI-SESSION EVENTS

(71) Applicant: Eventbase Technology Inc., Vancouver (CA)

(72) Inventors: Jeffrey Alan Sinclair, Vancouver (CA); Benjamin James West, Vancouver (CA); Raymond Au, Vancouver (CA)

(73) Assignee: Eventbase Technology Inc., Vancouver (CA)

( * ) Notice: Subject to any disclaimer, the term of this patent is extended or adjusted under 35 U.S.C. 154(b) by 20 days.

(21) Appl. No.: 18/911,449

(22) Filed: Oct. 10, 2024

(65) Prior Publication Data

US 2025/0037527 A1 Jan. 30, 2025

Related U.S. Application Data

(63) Continuation of application No. PCT/IB2023/053702, filed on Apr. 11, 2023.

(60) Provisional application No. 63/330,295, filed on Apr. 12, 2022.

(51) Int. Cl.

*G07C 9/27* (2020.01)
*G07C 9/00* (2020.01)
*G07C 9/22* (2020.01)
*G07C 9/28* (2020.01)

(52) U.S. Cl.

CPC ........... *G07C 9/27* (2020.01); *G07C 9/00309* (2013.01); *G07C 9/22* (2020.01); *G07C 9/28* (2020.01); *G07C 2009/00793* (2013.01)

(58) Field of Classification Search

CPC ........ G07C 9/27; G07C 9/00309; G07C 9/22; G07C 9/28; G07C 2009/00793; G07C 9/20; H04W 4/02; H04W 4/80; H04W 8/20

USPC ........................................ 340/5.6, 5.61

See application file for complete search history.

(56) References Cited

U.S. PATENT DOCUMENTS

| | | | | |
|---|---|---|---|---|
| 8,839,361 | B2 * | 9/2014 | R | G06F 21/31 726/19 |
| 9,589,402 | B2 * | 3/2017 | Raina | G07C 9/00309 |
| 9,911,086 | B2 * | 3/2018 | Gibson | G06Q 20/045 |
| 9,922,294 | B2 * | 3/2018 | Raina | H04W 4/80 |
| 10,186,098 | B2 * | 1/2019 | Lingan | H04W 4/33 |
| 11,348,396 | B2 * | 5/2022 | Meruva | G07C 9/00309 |
| 2003/0066883 | A1 * | 4/2003 | Yu | G06Q 20/04 235/382 |

(Continued)

OTHER PUBLICATIONS

International Search Report for PCT Application No. PCT/IB2023/053702 mailed Jul. 19, 2023.

*Primary Examiner* — Nam V Nguyen

(74) *Attorney, Agent, or Firm* — Wiggin and Dana LLP

(57) ABSTRACT

A method for maintaining a user profile is described, including: obtaining, from a mobile device, identification information uniquely identifying a user; obtaining location information of the user; obtaining time information related to the location information; and updating a user profile of the user based on the identification information, the location information, and the time information. The user profile is usable for determining the user's access to one or more sessions of a multi-session event. The user profile may be dynamically updated. A method performed by a mobile device, and corresponding apparatus, are also described.

19 Claims, 5 Drawing Sheets

(56) References Cited

U.S. PATENT DOCUMENTS

| | | | | |
|---|---|---|---|---|
| 2008/0015983 | A1* | 1/2008 | Spikes | G06Q 20/40 705/40 |
| 2011/0178891 | A1* | 7/2011 | Charriere | G06Q 30/08 705/26.2 |
| 2013/0124234 | A1* | 5/2013 | Nilsson | G06Q 30/02 705/5 |
| 2016/0078095 | A1 | 3/2016 | Man et al. | |
| 2019/0279461 | A1 | 9/2019 | Carter, Sr. | |

* cited by examiner

MOBILE BADGE FOR ACCESS AUTHORIZATION AT MULTI-SESSION EVENTS

CROSS-REFERENCE TO RELATED APPLICATIONS

This application is a continuation of PCT Application PCT/IB2023/053702, filed on Apr. 11, 2023, which claims priority of U.S. Provisional Patent Application No. 63/330,295, filed on Apr. 12, 2022, the specifications of which are hereby incorporated by reference herein in their entirety.

TECHNICAL FIELD

On or more embodiments of the present technology generally relates to authorizing access to events, and in particular to a mobile badge for access authorization at multi-session events.

BACKGROUND OF THE ART

Conventionally, access to an event has been managed by the selling of tickets to the event. A person could, for example, purchase a physical ticket which, when presented at an access terminal to the event, would grant access to the event to the bearer of the ticket. More recently, electronic tickets (sometimes called e-tickets) have been used, in which a person receives a scannable code, such as a QR code, instead of a physical ticket. In other examples, an electronic ticket may take the form of a code or signature corresponding to the ticket, that can be communicated from the attendee's mobile device to a terminal at an access point to the event, for example by near-field communication (NFC). This simplifies ticket purchasing, and also removes the need for a person to carry a ticket on his person, provided the person is already carrying a smartphone or similar electronic device.

For both physical and electronic tickets, authentication of the ticket is a concern. Each purchaser should be able to use their ticket to access the event, and the hosting venue should be able to distinguish validly purchased tickets from counterfeit tickets. In addition, each ticket should only be redeemable once, to prevent multiple people from using the same ticket to access the event. In this way, all authorized ticketholders and only authorized ticketholders will be granted access to the event.

Although this might be adequate for some applications, such as a sporting event where a person only needs to gain access to the venue once, an improved system and method is desired for managing more complex events. For example, where the event contains multiple individual sessions that have different access requirements or permissions, it may be impractical to issue multiple separate tickets to an attendee, or to encode all of the access information for each attendee in a single electronic ticket.

There is a need for an improved system and method for providing a ticket for an event that enables access control for multiple sessions within the event, and that is convenient for attendees to use.

SUMMARY

It is an aspect of one or more embodiments of the present technology to improve at least some of the limitations of the prior art.

It is an aspect of one or more embodiments of the present technology to provide a mobile badge, alternatively referenced herein as a dynamic electronic ticketing system, for access to multi-session events.

In one aspect, an electronic ticket system for a multi-session event involves identifying a user of a mobile device, determining a location of a user of the mobile device, and determining, based on a user profile of the user, whether the user is permitted to access a session of the event.

In another aspect, a mobile device transmits identifying information of the user, and location information of the user. The mobile device communicates a signal associated with a session of a multi-session event. The mobile device receives an indication of whether the user is granted access to the session.

According to a broad aspect, there is disclosed a method for maintaining a user profile, the method comprising obtaining, from a mobile device, identification information uniquely identifying a user; obtaining location information of the user; obtaining time information related to the location information; and updating a user profile of the user based on the identification information, the location information, and the time information; wherein the user profile is usable for determining the user's access to one or more sessions of a multi-session event.

In accordance with one or more embodiments, the updating of the user profile of the user comprises dynamically updating the user profile of the user.

In accordance with one or more embodiments, the method further comprises determining the user's access to a session based on the user profile, the identification information, the location information, and the time information.

In accordance with one or more embodiments, the location information is based on at least one of a location of the mobile device and a location of a previous session accessed by the user.

In accordance with one or more embodiments, the user profile comprises an history of sessions previously attended by the user.

In accordance with one or more embodiments, the user profile comprises health information of the user.

In accordance with one or more embodiments, the method further comprises assigning a reward to the user in response to the user accessing or completing one or more sessions of the multi-session event.

In accordance with a broad aspect, there is disclosed a system for maintaining a user profile, comprising a server configured to obtain identification information uniquely identifying a user; obtain location information of the user; obtain time information related to the location information; and update a user profile of the user based on the identification information, the location information, and the time information; wherein the user profile is usable for determining the user's access to one or more sessions of a multi-session event.

In accordance with one or more embodiments, the updating of the user profile of the user comprises dynamically updating the user profile of the user.

In accordance with one or more embodiments, the server is further configured to determine the user's access to a session based on the user profile, the identification information, the location information, and the time information.

In accordance with one or more embodiments, the location information is based on at least one of a location of the mobile device; and a location of a previous session accessed by the user.

In accordance with one or more embodiments, the user profile includes an history of sessions previously attended by the user.

In accordance with one or more embodiments, the user profile includes health information of the user.

In accordance with one or more embodiments, the server is further configured to assign a reward to the user in response to the user accessing or completing one or more sessions of the multi-session event.

In accordance with a broad aspect, there is disclosed a method performed by a mobile device for accessing one or more sessions of a multi-session event, the method comprising transmitting, by the mobile device, identification information uniquely identifying a user of the mobile device; transmitting, by the mobile device, location information and time information related to the location information; communicating a signal representative of a session of the multi-session event; and receiving an indication of the user's access to the session, wherein the user's access to the session is determined based on the identification information, the location information, the time information, and a profile associated with the user.

In accordance with one or more embodiments, the method further comprises dynamically updating the profile associated with the user.

In accordance with one or more embodiments, said communicating of the signal representative of the session comprises communicating a short-range wireless signal between the mobile device and an access terminal corresponding to the session.

In accordance with one or more embodiments, the short-range wireless signal is one of a Bluetooth signal, an ultra-wideband (UWB) signal, and a near-field communication (NFC) signal.

In accordance with one or more embodiments, the method further comprises providing to the user an indication of the user's access to the session.

In accordance with one or more embodiments, said providing of the indication of the user's access to the session comprises displaying to the user the indication of the user's access to the session.

According to a broad aspect, there is disclosed a mobile device configured to transmit, to a server, identification information uniquely identifying a user of the mobile device; transmit, to the server, location information and time information related to the location information; communicate a signal representative of a session of the multi-session event; and receive an indication of the user's access to the session, wherein the user's access to the session is determined based on the identification information, the location information, the time information, and a profile associated with the user.

In accordance with one or more embodiments, the mobile device is further configured to dynamically update the profile associated with the user.

In accordance with one or more embodiments, said communicating of the signal representative of the session comprises communicating a short-range wireless signal between the mobile device and an access terminal corresponding to the session.

In accordance with one or more embodiments, the short-range wireless signal is one of a Bluetooth signal, an ultra-wideband (UWB) signal, and a near-field communication (NFC) signal.

In accordance with one or more embodiments, the mobile is further configured to provide to the user an indication of the user's access to the session.

In accordance with one or more embodiments, said providing of the indication of the user's access to the session comprises displaying to the user the indication of the user's access to the session.

In accordance with another broad aspect, there is disclosed a method for maintaining a user profile, comprising: obtaining, from a mobile device, identification information uniquely identifying a user; obtaining location information of the user; obtaining time information related to the location information; updating a user profile of the user based on the identification information, the location information, and the time information; and creating a mobile badge using the user profile; wherein the user's access to one or more sessions of a multi-session event is determined based on the mobile badge and other contextual information.

In another aspect of the method, the mobile badge is updatable in real-time.

In accordance with another broad aspect, there is disclosed a system for maintaining a user profile, comprising: a server configured to: obtain identification information uniquely identifying a user; obtain location information of the user; obtain time information related to the location information; update a user profile of the user based on the identification information, the location information, and the time information; and create a mobile badge using the user profile; wherein the user's access to one or more sessions of a multi-session event is determined based on the mobile badge and other contextual information.

In another aspect of the system, the mobile badge is updatable in real-time.

In accordance with another broad aspect, there is disclosed a method performed by a mobile device for accessing one or more sessions of a multi-session event, comprising: transmitting, by the mobile device, identification information uniquely identifying a user of the mobile device; transmitting, by the mobile device, location information and time information related to the location information; storing a mobile badge on the mobile device; communicating a signal representative of a session of the multi-session event; and receiving an indication of the user's access to the session, wherein the user's access to the session is determined based on the identification information, the location information, the time information, the mobile badge, and a profile associated with the user.

In another aspect, the method further comprises updating the mobile badge in real-time according to criteria or rules that are applied by a server.

In accordance with another broad aspect, there is disclosed a mobile device configured to: transmit, to a server, identification information uniquely identifying a user of the mobile device; transmit, to the server, location information and time information related to the location information; storing a mobile badge on the mobile device; communicate a signal representative of a session of the multi-session event; and receive an indication of the user's access to the session, wherein the user's access to the session is determined based on the identification information, the location information, the time information, the mobile badge, and a profile associated with the user.

In another aspect, the mobile device is further configured to update the mobile badge in real-time according to criteria or rules that are applied by the server.

In accordance with another broad aspect, there is disclosed a method for maintaining a user profile used for authorization by an access terminal to attend one or more sessions of a multi-session event, comprising: obtaining, from a mobile device, identification information uniquely identifying a user; obtaining location information of the user; obtaining time information related to the location information; updating a user profile of the user based on the identification information, the location information, and the time information; and creating a dynamic electronic ticket using the user profile; wherein the user's access to one or more sessions of a multi-session event is determined based on the dynamic electronic ticket and other contextual information, authorization of the user to attend the one or more sessions is changeable over time based upon the user's previous use of the dynamic electronic ticket, and the access terminal communicates with the mobile device using a short-range wireless signal between the mobile device and an access terminal corresponding to the session.

In accordance with another broad aspect, there is disclosed a system for maintaining a user profile used for authorization by an access terminal to attend one or more sessions of a multi-session event, comprising: a server configured to: obtain identification information uniquely identifying a user; obtain location information of the user; obtain time information related to the location information; update a user profile of the user based on the identification information, the location information, and the time information; and create a dynamic electronic ticket using the user profile; wherein the user's access to one or more sessions of a multi-session event is determined based on the dynamic electronic ticket and other contextual information, authorization of the user to attend the one or more sessions is changeable over time based upon the user's previous use of the dynamic electronic ticket, and the access terminal communicates with the mobile device using a short-range wireless signal between the mobile device and an access terminal corresponding to the session.

In accordance with another broad aspect, there is disclosed a method performed by a mobile device for authorization by an access terminal used for accessing one or more sessions of a multi-session event, comprising: transmitting, by the mobile device, identification information uniquely identifying a user of the mobile device; transmitting, by the mobile device, location information and time information related to the location information; storing a dynamic electronic ticket on the mobile device; communicating a signal representative of a session of the multi-session event; and receiving an indication of the user's access to the session, wherein the user's access to the session is determined using the dynamic electronic ticket and based on the identification information, the location information, the time information, and a profile associated with the user, wherein authorization of the user to attend the one or more sessions is changeable over time based upon the user's previous use of the dynamic electronic ticket, and the access terminal communicates with the mobile device using a short-range wireless signal between the mobile device and an access terminal corresponding to the session.

In accordance with another broad aspect, there is disclosed a mobile device used for authorization by an access terminal to attend one or more sessions of a multi-session even, the mobile device configured to: transmit, to a server, identification information uniquely identifying a user of the mobile device; transmit, to the server, location information and time information related to the location information; storing a dynamic electronic ticket on the mobile device; communicate a signal representative of a session of the multi-session event; and receive an indication of the user's access to the session, wherein the user's access to the session using the dynamic electronic ticket and is determined based on the identification information, the location information, the time information, and a profile associated with the user, wherein the authorization of the user to attend the one or more sessions is changeable over time based upon the user's previous use of the dynamic electronic ticket, and the access terminal communicates with the mobile device using a short-range wireless signal between the mobile device and an access terminal corresponding to the session.

BRIEF DESCRIPTION OF THE DRAWINGS

Having thus generally described the nature of the technology, reference will now be made to the accompanying drawings, showing by way of illustration example embodiments thereof and in which.

DETAILED DESCRIPTION

Figure 1:
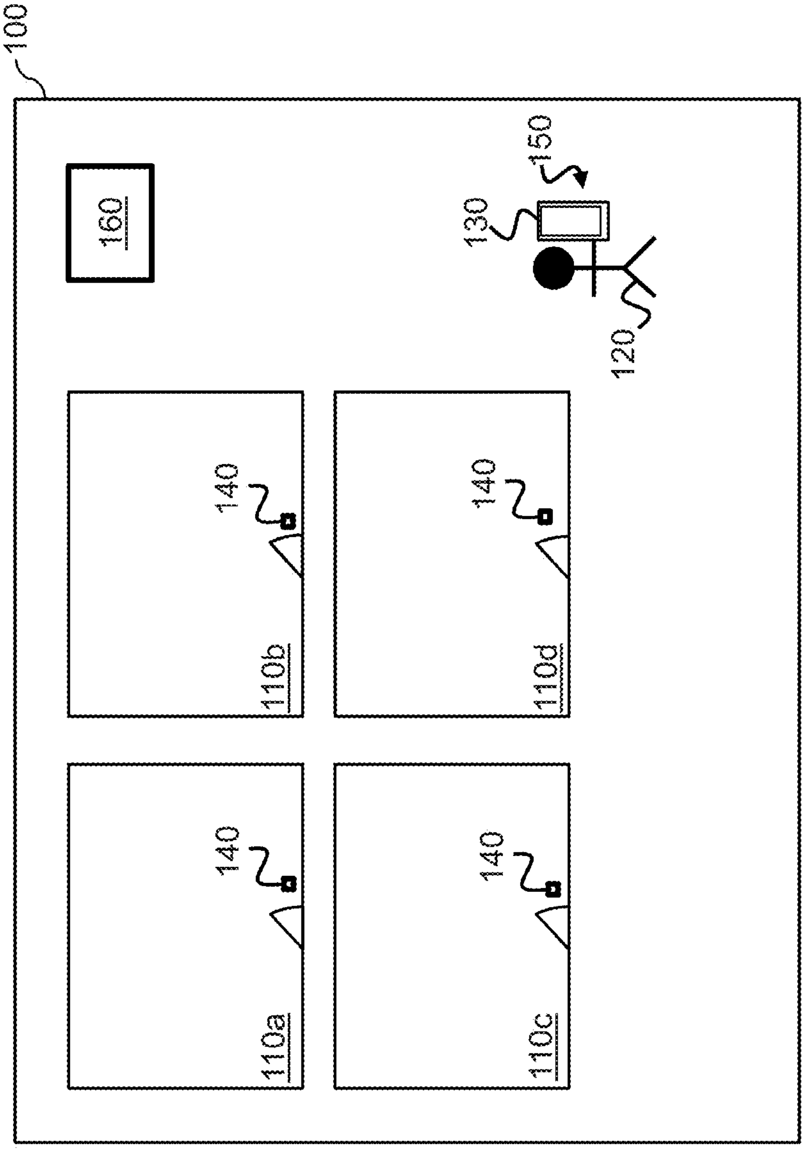
FIG. 1 is a schematic view of a multi-session event.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus, information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Now referring to FIG. 1, there is shown a schematic view of a multi-session event 100. The event contains multiple sessions 110*a*-110*d* (collectively or individually 110) therein, each of which may be accessed by an attendee or user 120 upon presenting the appropriate credential for that session 110. The attendee 120 may use a mobile device 130, such as a smartphone, to interact with an access terminal 140 of a session 110 and verify that the user 120 is authorized to access the session 110. It will be appreciated that the access terminal 140 may be manned or automated. The mobile device 130 has stored thereon an electronic ticket 150, which replaces the need for a physical ticket. The electronic ticket 150 will be described below in further detail. It will be appreciated that the session 110 may be of various types. In fact, the session 110 may be one of multiple talks given at a conference, or one of multiple zones or areas or activities accessible by different event attendees or groups of attendees, for example based on their profession, on an occupation, a gender, a type of ticket purchased, previous sessions attended within the event 100, an available capacity in the event 110, or any other criterion. As such, it should be understood that the permission for a particular attendee 120 to attend a particular session 110 may change over time or in response to other factors, some of which may potentially be determined from the attendee's previous use of the ticket 150, as will be described below in further detail.

It will be appreciated that the mobile device 130 is capable of communicating with the access terminal 140 using any suitable communication technology. In one or more embodiments, the communication technology is selected from a group consisting of near-field communication (NFC), Bluetooth, and ultra-wideband (UWB). The skilled addressee will appreciate that various alternative embodiments may be provided for the communication technology. The mobile device 130 may also be capable of communicating with one or more servers 160 which are used to track and modify permissions associated with the tickets 150 of the attendees 120 at the event 100. The servers 160 are also in communication with the access terminals 140, using any suitable communication technology. In one or more embodiments, the communication technology is one of a cellular communication, a Wi-Fi communication, and a wired communication. The skilled addressee will appreciate that various alternative embodiments may be provided for the communication technology.

Figure 2:
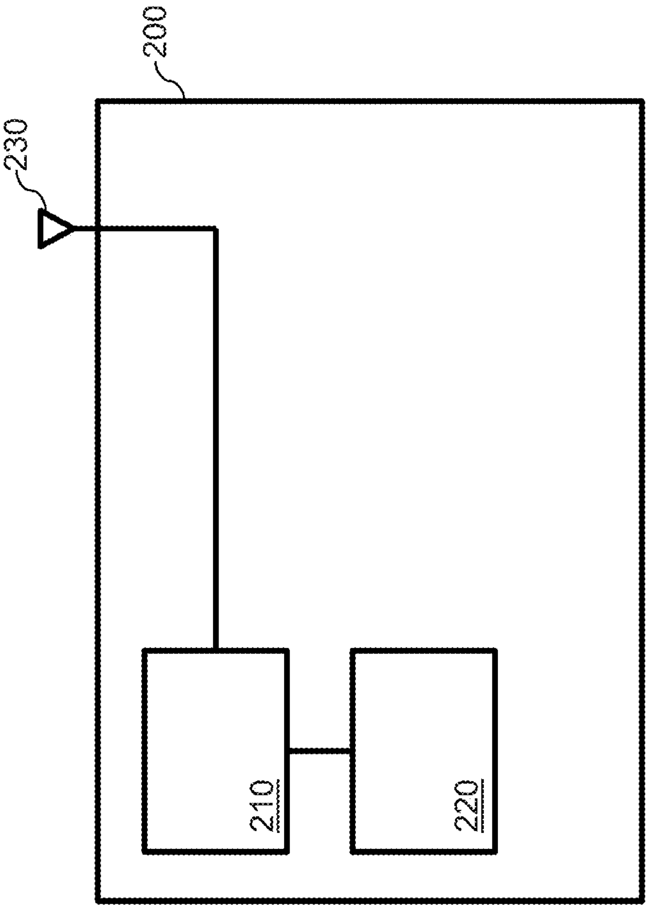
FIG. 2 is a block diagram of a computing device, which may be embodied in a server, a mobile device, or an access terminal at an event.

Now referring to FIG. 2, there is shown a block diagram of a computing device, which may be embodied in one or more of the mobile device 130, the access terminal 140, or the server 160 described above. It should be understood that the operation of the computing device 200 may be adapted to its desired function, and additional functionalities may be provided as desired.

In one or more embodiments, the computing device 200 comprises a processor 210, one or more memories 220 operatively connected to the processor 210 for storing information such as a database relating to the event 100, user profiles for one or more ticketholders, or instructions for the processor 210, and one or more transmitters and/or receivers, represented in FIG. 2 as an antenna 230. It will be appreciated that the number and type of transmitters and/or receivers may vary, and may depend on the required communication functions of the computing device 200, and may include wired and/or wireless transmitters and/or receivers. A particular mode of communication may be provided with only a transmitter or only a receiver, or with a unified transceiver instead of separate transmitter and receiver, depending on the needs of the computing device 200. The functions of the computing device 200 will be described below in further detail.

Figure 3:
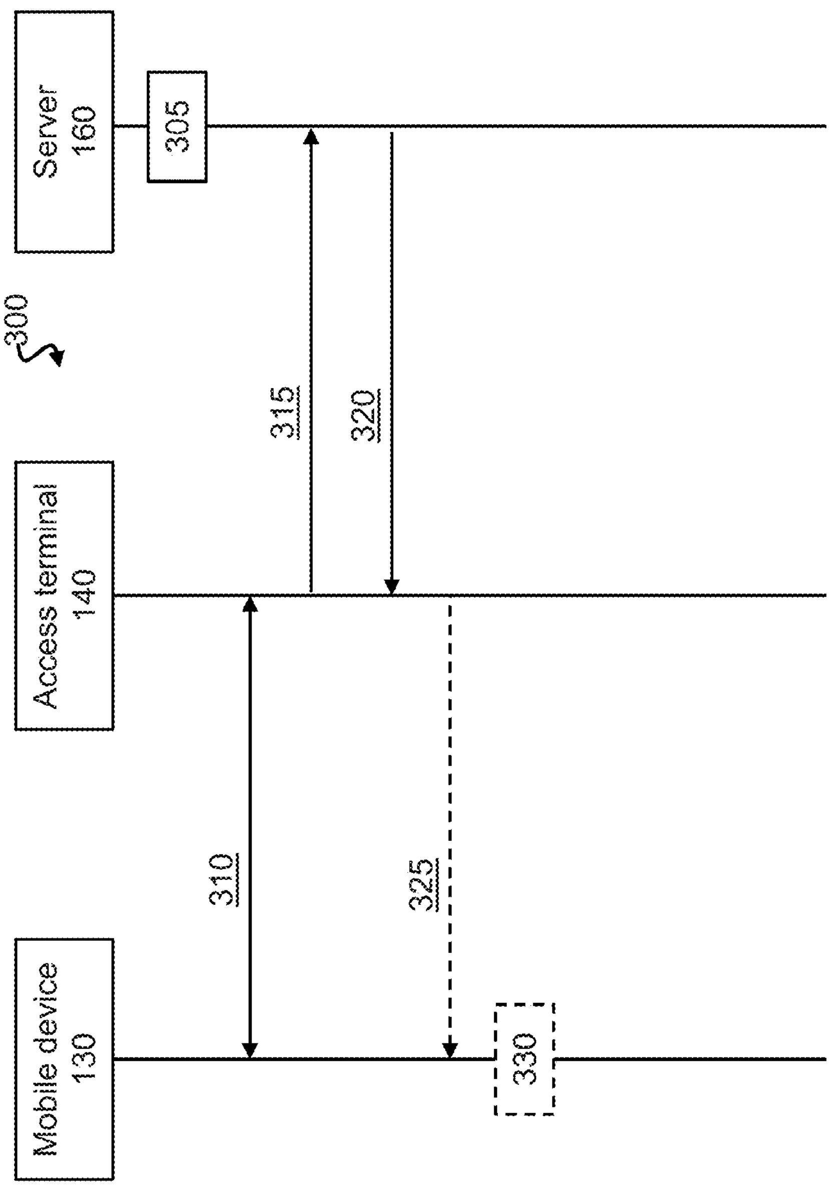
FIG. 3 is a call flow diagram of an example method of determining access to a session according to a first embodiment.

Now referring to FIG. 3, there is shown a call flow diagram of an example method 300 of determining access to a session according to a first embodiment, involving an example mobile device 130 having a ticket 150 stored thereon, an access terminal 140 for a session 110, and a server 160.

The server 160 has a user profile 305 stored thereon, containing previously obtained information about the user of the mobile device 130. It will be appreciated that the user profile 305 may contain any known information that is pertinent to the use of the ticket 150, for example any one or more of: the user's name, gender, health status, address, occupation, type of ticket purchased, or history of sessions attended.

The server 160 may also store previously obtained location information about the user as part of the user profile 305. It will be appreciated that the location information about the user can be determined according to various embodiments. In one or more embodiments, the location information is determined using the global positioning system (GPS) capability of the mobile device 130. In one or more alternative embodiments, the location information is obtained using a record of access terminals 140 or other devices that have previously communicated with the mobile device 130 via a short-range protocol such as Bluetooth, ultra-wideband (UWB) or near-field communication (NFC), or by any other suitable means.

The server 160 may also have obtained, and stored as part of the user profile 305, time information related to the location information. It will be appreciated that the time information related to the location information may be of various types. In one or more embodiments, the time information related to the location information may be a time when the user was at a particular location or interacted with a particular access terminal 140 or other device, or attended another session 110. Additional or alternative examples of information that might be stored as part of the user profile 305 will be described below or may be apparent to the skilled addressee.

According to processing step 310, an attendee 120 uses the mobile device 130 to attempt to access the session 110. It will be appreciated that this involves communication between the mobile device 130 and the access terminal 140. It will be appreciated that the communication may be of various types. In one or more embodiments, the communication may be a near-field communication (NFC), scanning a QR code, or any other suitable form of short-range communication. The skilled addressee will appreciate that the communication may be of various alternative types. In one or more embodiments, the communication is initiated by the mobile device 130, for example when the attendee attempts to use a ticket 150 on the mobile device 130 access the session 110. In one or more alternative embodiments, the communication is initiated by the access terminal 140, for example in the case where the access terminal 140 monitors its vicinity for attendees attempting to access the session 110. The communication between the mobile device 130 and the access terminal 140 comprises the mobile device 130 transmitting to the access terminal 140 an identifier of the user. It will be appreciated that the identifier is an embodiment of identification information uniquely identifying the user. It will be appreciated that the identifier may be of various types. In one or more embodiments, the identifier comprises a number or code associated with the ticket 150 purchased by the user. The skilled addressee will appreciate that various alternative embodiments may be possible for the identifier.

According to processing step 315, the access terminal 140 communicates with the server 160. More precisely, the access terminal 140 may transmit to the server 160 the identifier of the user that was received at 310. The server 160 may then determine, based on at least the identifier and the stored profile, whether the user is permitted to access the session 110. This determination will be discussed below in further detail. The server 160 may also update its profile based on the user's interaction with the access terminal 140, including the time and location of the interaction.

According to processing step 320, the server 160 communicates with the access terminal 140. More precisely and in one or more embodiments, the server 160 informs the access terminal 140 whether the user is authorized to attend the session 110.

According to processing step 325, the access terminal 140 optionally communicates with the mobile device 130 a signal indicative of the session 110, for example whether the user is authorized to attend the session 110 or not. It will be appreciated that instead of or in addition to communicating with the mobile device 130, the access terminal 140 may communicate with the user directly, for example using at least one of an audio and a visual feedback signal indicating whether or not the user is permitted to access the session 110.

According to processing step 330, the mobile device 130 optionally provides the user with an indication of whether the user may access the session 110. The indication may be at least one of an audio and a visual display on the screen of the mobile device 130, for example. It will be appreciated that the visual display may optionally be shown to an attendant at the session 110, to confirm that the attendee is authorized to attend the session 110. The mobile device 130 may additionally provide the user with information about the session 110, if the user is permitted to attend the session 110.

It will be appreciated that the method disclosed at FIG. 3 can be repeated at multiple sessions 110 within an event, such that the user may potentially access multiple different sessions 110.

Figure 4:
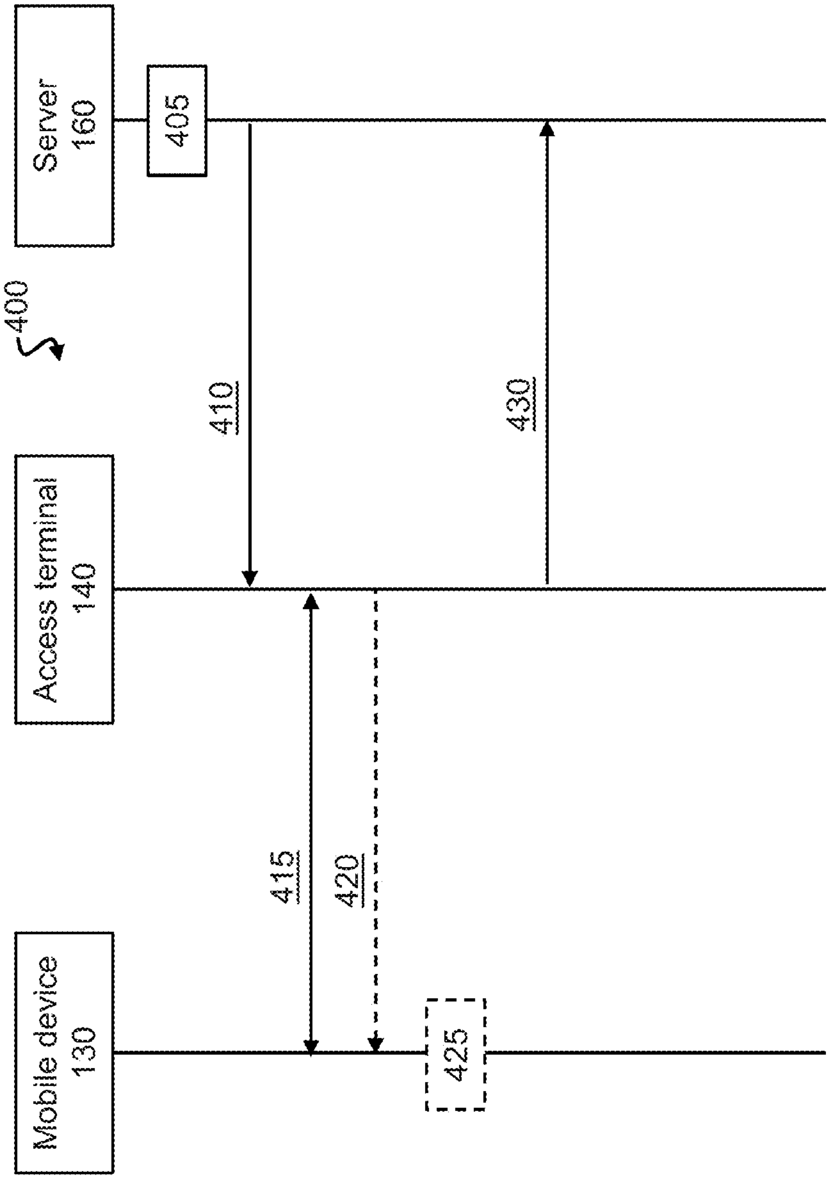
FIG. 4 is a call flow diagram of an example method of determining access to a session according to a second embodiment.

Now referring to FIG. 4, there is shown a call flow diagram of an example method 400 of determining access to a session according to a second embodiment, involving an example mobile device 130 having a ticket 150 stored thereon, an access terminal 140 for a session 110, and a server 160.

The server 160 has a user profile 405 stored thereon, containing previously obtained information about the user of the mobile device 130. It will be appreciated that the user profile 405 may contain any known information that is pertinent to the use of the ticket 150, for example any one or more of: the user's name, gender, health status, address, occupation, type of ticket purchased, or history of sessions attended.

The server 160 may also store previously obtained location information about the user as part of the user profile 405. It will be appreciated that the location information about the user can be determined according to various embodiments. In one or more embodiments, the location information is determined using the global positioning system (GPS) capability of the mobile device 130. In one or more alternative embodiments, the location information is obtained using a record of access terminals 140 or other devices that have previously communicated with the mobile device 130 via a short-range protocol such as Bluetooth, ultra-wideband (UWB) or near-field communication (NFC), or by any other suitable means.

The server 160 may also have obtained, and stored as part of the user profile 405, time information related to the location information. It will be appreciated that the time information related to the location information may be of various types. In one or more embodiments, the time information related to the location information may be a time when the user was in a particular location or interacted with a particular access terminal 140 or other device, or attended another session 110. Additional or alternative examples of information that might be stored as part of the user profile 405 will be described below or may be apparent to the skilled addressee.

According to processing step 410, the server 160 communicates with the access terminal 140. More precisely, the server 160 may transmit profile information, location information, or time information related to the location information, or other information about the attendees that is sufficient for the access terminal 140 to determine which attendees are permitted to access the session 110. Alternatively or additionally, the server 160 may transmit to the access terminal 140 an indication of which attendees are permitted to access the session 110, determined based on the user profile 405 and optionally other information about the attendees stored at the server 160. This determination will be discussed below in further detail. It will be appreciated that this communication may occur periodically or whenever one or more profiles are updated by the server 160, to ensure that the information available to the access terminal 140 is kept up-to-date.

According to processing step 415, an attendee 120 uses the mobile device 130 to attempt to access the session 110. It will be appreciated that this involves a communication between the mobile device 130 and the access terminal 140. It will be appreciated that the communication may be performed according to various embodiments. In one or more embodiments, the communication is one of a near-field communication (NFC), scanning a QR code, and any other suitable form of short-range communication. In one or more embodiments, the communication is initiated by the mobile device 130, for example when the attendee attempts to use a ticket 150 on the mobile device 130 access the session 110. In one or more alternative embodiments, the communication is initiated by the access terminal 140, for example if the access terminal 140 monitors its vicinity for attendees attempting to access the session 110. The communication includes the mobile device 130 transmitting to the access terminal 140 an identifier of the attendee, for example a number or code associated with the ticket 150 purchased by the attendee. The access terminal 140 then determines whether the attendee is permitted to access the session 110, based on the information received from the server 160 at processing step 410. As discussed in reference to processing step 410, this determination may be made based on the profile information, including location information, and time information related to the location information, received from the server 160, or it may be made by the access terminal 140 checking whether the server 160 has previously determined that the attendee is permitted to attend the session 110.

According to processing step 420, the access terminal 140 optionally communicates with the mobile device 130 a signal indicative of the session 110, for example whether the user is authorized to attend the session 110. It will be appreciated that instead of or in addition to communicating with the mobile device 130, the access terminal 140 may communicate with the user directly, for example with at least one of an audio and a visual feedback signal indicating whether the user is permitted to access the session 110.

According to processing step 425, the mobile device 130 optionally gives the user an indication of whether the user may access the session 110. The indication may be at least one of an audio and a visual feedback displayed on the screen of the mobile device 130, for example. It will be appreciated that the visual display may optionally be shown to an attendant at the session 110, to confirm that the attendee is authorized to attend the session 110. The mobile device 130 may additionally give the user information about the session 110, if the user is permitted to attend the session 110.

According to processing step 430, the access terminal 140 communicates with the server 160. More precisely, the access terminal 140 may transmit to the server 160 the identifier of the user that was received at processing step 415, and optionally the result of the access determination at processing step 415. The server 160 may also update its profile based on the location and time of the user's interaction with the access terminal 140. The access terminal 140 may store the information, for example if a connection with the server 160 is unavailable, or to reduce demand for communication resources by communicating access events to the server 160 periodically or in batches.

It will be appreciated that the method disclosed at FIG. 4 can be repeated at multiple sessions 110 within an event, such that the user may potentially access multiple different sessions 110.

It will be appreciated by the skilled addressee that the method disclosed at FIG. 4 may be useful for reducing latency in the interactions between the mobile device 130 and the access terminal 140, for example in a large event where many attendees are expected to interact with an access terminal 140 in a short amount of time, which is of great advantage.

It will be further appreciated that the method disclosed at FIG. 4 may also be useful for mitigating the risk that the access terminal 140 and the server 160 might not be able to communicate with each other during the time when the attendee interacts with the access terminal 140, for example due to unforeseen network problems or a high volume of attendees which is of great advantage.

Figure 5:
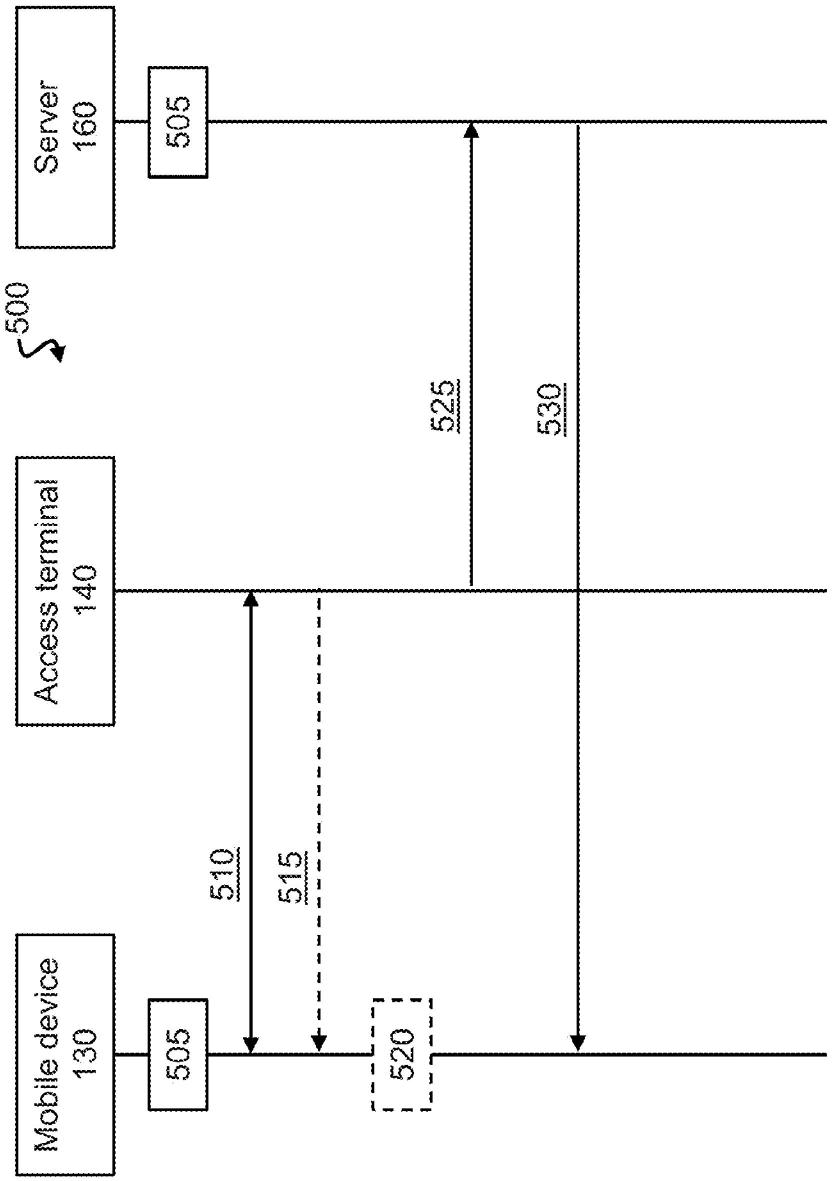
FIG. 5 is a call flow diagram of an example method of determining access to a session according to a third embodiment.

Now referring to FIG. 5, there is shown a call flow diagram of an example method 500 of determining access to a session according to a third embodiment, involving an example mobile device 130 having a ticket 150 stored thereon, an access terminal 140 for a session 110, and a server 160.

The server 160 has a user profile 505 stored thereon, containing previously obtained information about the user of the mobile device 130. It will be appreciated that the user profile 505 may contain any known information that is pertinent to the use of the ticket 150, for example any one or more of: the user's name, gender, an health status, an address, an occupation, a type of ticket purchased, or an history of sessions attended.

The server 160 may also store previously obtained location information about the user as part of the user profile 505. It will be appreciated that the location information about the user can be determined according to various embodiments. In one or more embodiments, the location information is determined using the global positioning system (GPS) capability of the mobile device 130. In one or more alternative embodiments, the location information is obtained using a record of access terminals 140 or other devices that have previously communicated with the mobile device 130 via a short-range protocol such as Bluetooth, ultra-wideband (UWB) or near-field communication (NFC), or by any other suitable means.

The server 160 may also have obtained, and stored as part of the user profile 305, time information related to the location information. It will be appreciated that the time information related to the location information may be of various types. In one or more embodiments, the time information related to the location information may be a time when the user was in a particular location or interacted with a particular access terminal 140 or other device, or attended another session 110. Additional or alternative examples of information that might be stored as part of the user profile 505 will be described below or may be apparent to a person of skill in the art. It will be appreciated that the user profile 505 can be synced to the mobile device 130 belonging to the holder of the ticket 150, for example when the mobile device 130 is detected in the vicinity of the event, or periodically thereafter, or whenever the profile 505 is updated at the server 160. The mobile device 130 may then update the ticket 150 based on the updated profile 505, including updating the ticket 150 to reflect access granted or restricted to one or more sessions 110. In one or more embodiments, the profile 505 stored on the mobile device 130 is encrypted, for example to prevent unauthorized modification of the profile 505 or to prevent third-party use of the profile to gain access to sessions 110. The skilled addressee will appreciate that the encryption may be performed according to various embodiments.

According to processing step 510, an attendee 120 uses the mobile device 130 to attempt to access the session 110. It will be appreciated that this involves a communication between the mobile device 130 and the access terminal 140. It will be appreciated that the communication may be performed according to various embodiments. In one or more embodiments, the communication is one of a near-field communication (NFC), scanning a QR code, or any other suitable form of short-range communication. In one or more embodiments, the communication is initiated by the mobile device 130, for example when the attendee attempts to use a ticket 150 on the mobile device 130 access the session 110. In one or more alternative embodiments, the communication is initiated by the access terminal 140, for example if the access terminal 140 monitors its vicinity for attendees attempting to access the session 110. It will be appreciated that the communication at processing step 510 includes the mobile device 130 transmitting to the access terminal 140 an identifier of the attendee. It will be appreciated that the identifier of the attendee may be of various types. In one or more embodiments, the identifier comprises a number or code associated with the ticket 150 purchased by the attendee. The attendee may also or instead transmit information from the profile 505 to the access terminal 140. The access terminal 140 then determines whether the attendee is permitted to access the session 110, based on the information received from the mobile device at 510. As discussed in reference to processing step 410, this determination may be made based on the profile information, including location information, and time information related to the location information, received from the server 160, or it may be made by the access terminal 140 checking whether the server 160 has previously determined that the attendee is permitted to attend the session 110.

According to processing step 515, the access terminal 140 optionally communicates with the mobile device 130 a signal indicative of the session 110, for example whether the user is authorized to attend the session 110. It will be appreciated that instead of or in addition to communicating with the mobile device 130, the access terminal may communicate with the user directly, for example with at least one of an audio and a visual feedback signal indicating whether the user is permitted to access the session 110.

According to processing step 520, the mobile device 130 optionally gives the user an indication of whether the user may access the session 110. The indication may be at least one of an audio and a visual feedback displayed on the screen of the mobile device 130, for example. It will be appreciated that the visual display may optionally be shown to an attendant at the session 110, to confirm that the attendee is authorized to attend the session 110. The mobile device 130 may additionally give the user information about the session 110, if the user is permitted to attend the session 110.

According to processing step 525, the access terminal 140 communicates with the server 160. More precisely, the access terminal 140 may transmit to the server 160 the identifier of the user that was received at 510, and optionally the result of the access determination at 510. The server 160 may also update its profile based on the location and time of the user's interaction with the access terminal 140.

According to processing step 530, the server 160 communicates with the mobile device 130 to update the profile 505 based on the interaction with the access terminal 140. It will be appreciated that the server 160 may also use this communication to update the profile 505 based on any other profile information that has not yet been synced to the mobile device 130.

It will be appreciated that the method disclosed at FIG. 5 can be repeated at multiple sessions 110 within an event, such that the user may potentially access multiple different sessions 110.

It will be further appreciated that the method disclosed at FIG. 5 may be useful for reducing latency in the interaction between the mobile device 130 and the access terminal 140, for example in a large event where many attendees are expected to interact with an access terminal 140 in a short amount of time, which is of great advantage.

It will be further appreciated that the method disclosed at FIG. 5 may also be useful for mitigating the risk that the mobile device 130 and the server 160 might not be able to communicate with each other during the time when the attendee interacts with the access terminal 140, for example due to unforeseen network problems or a high volume of attendees which is of great advantage.

In the methods described above, a user's profile is updated based on the user's interaction with an access terminal 140 for a session 110. It should be understood that any update to a user's profile may affect the user's permission to subsequently access the same or a different session 110, because session access is based on the profile information.

It has been contemplated that the user profile may be updated in other ways. For example, the user may dynamically update his own profile, and thereby change his permission to access sessions or rewards, by performing specified actions. For example, a user may pay to upgrade his ticket, thereby obtaining or upgrading his access to at least one session. In another example, a user may obtain or upgrade his access to at least one session by completing one or more tasks, such as attending one or more specified sessions, going to one or more specified locations, or interacting with one or more specified people at the event. The possibility to modify a user's profile in this way could, for example, be communicated to the user in the form of a contest (such as a scavenger hunt) promoted at the event. Other ways for users to dynamically modify their own profile or otherwise dynamically alter their permissions to access events, will be apparent to the skilled addressee.

There is also disclosed a method for maintaining a user profile, comprising. The method comprises obtaining, from a mobile device, identification information uniquely identifying a user. The method further comprises obtaining location information of the user. The method further comprises obtaining time information related to the location information and updating a user profile of the user based on the identification information, the location information, and the time information. It will be appreciated that the user profile is usable for determining the user's access to one or more sessions of a multi-session event.

In one or more embodiments of the method, the updating of the user profile of the user comprises dynamically updating the user profile of the user.

In one or more embodiments of the method, the method further comprises determining the user's access to a session based on the user profile, the identification information, the location information, and the time information.

In one or more embodiments of the method, the location information is based on at least one of a location of the mobile device and a location of a previous session accessed by the user.

In one or more embodiments of the method, the user profile comprises a history of sessions previously attended by the user.

In one or more embodiments of the method, the user profile comprises health information of the user.

In one or more embodiments of the method, the method further comprises assigning a reward to the user in response to the user accessing or completing one or more sessions of the multi-session event.

There is also disclosed a system for maintaining a user profile. The system comprises a server configured to obtain identification information uniquely identifying a user; obtain location information of the user; obtain time information related to the location information; and update a user profile of the user based on the identification information, the location information, and the time information. It will be appreciated that the user profile is usable for determining the user's access to one or more sessions of a multi-session event.

In one or more embodiments of the system, the updating of the user profile of the user comprises dynamically updating the user profile of the user.

In one or more embodiments of the system, the server is further configured to determine the user's access to a session based on the user profile, the identification information, the location information, and the time information.

In one or more embodiments of the system, the location information is based on at least one of a location of the mobile device; and a location of a previous session accessed by the user.

In one or more embodiments of the system, the user profile includes an history of sessions previously attended by the user.

In one or more embodiments of the system, the user profile includes health information of the user.

In one or more embodiments of the system, the system is configured to assign a reward to the user in response to the user accessing or completing one or more sessions of the multi-session event.

There is also disclosed a method performed by a mobile device for accessing one or more sessions of a multi-session event. The method comprises transmitting, by the mobile device, identification information uniquely identifying a user of the mobile device. The method further comprises transmitting, by the mobile device, location information and time information related to the location information. The method further comprises communicating a signal representative of a session of the multi-session event; and receiving an indication of the user's access to the session. It will be appreciated that the user's access to the session is determined based on the identification information, the location information, the time information, and a profile associated with the user.

In one or more embodiments of the method, the method further comprises dynamically updating the profile associated with the user.

In one or more embodiments of the method, the communicating of the signal representative of the session comprises communicating a short-range wireless signal between the mobile device and an access terminal corresponding to the session.

In one or more embodiments of the method, the short-range wireless signal is one of a Bluetooth signal, an ultra-wideband (UWB) signal, and a near-field communication (NFC) signal.

In one or more embodiments of the method, the method further comprises providing to the user an indication of the user's access to the session.

In one or more embodiments of the method, the providing of the indication of the user's access to the session comprises displaying to the user the indication of the user's access to the session.

There is also disclosed a mobile device configured to transmit, to a server, identification information uniquely identifying a user of the mobile device; transmit, to the server, location information and time information related to the location information; communicate a signal representative of a session of the multi-session event; and receive an indication of the user's access to the session, wherein the user's access to the session is determined based on the identification information, the location information, the time information, and a profile associated with the user.

In one or more embodiments, the mobile device is further configured to dynamically update the profile associated with the user.

In one or more embodiments of the method, the communicating of the signal representative of the session comprises communicating a short-range wireless signal between the mobile device and an access terminal corresponding to the session.

In one or more embodiments of the mobile device, the short-range wireless signal is one of a Bluetooth signal, an ultra-wideband (UWB) signal, and a near-field communication (NFC) signal.

In one or more embodiments, the mobile device is further configured to provide to the user an indication of the user's access to the session.

In one or more embodiments of the method, the providing of the indication of the user's access to the session comprises displaying to the user the indication of the user's access to the session. By using one or more of the methods described above, a dynamic electronic ticket 150 can be provided that separately regulates access to multiple sessions within a multi-session event. Access to each session can be determined based on the ticket, the user profile, as well as based on other contextual information available to either the access terminal 140 or server 160. Other information that may be used to determine access to a session 110 may include one or more of: available capacity in the session 110, number of people already attending the session 110, number of people of a particular type attending the session 110 as determined by the profile information of other attendees, whether the attendee has attended a previous related session; whether the attendee has already attended a threshold number of previous sessions; specific requirements for the session 110 such as demographic composition or health status of the attendees; whether the attendee has a particular role at the session 110 such as being a speaker at the session 110, etc. Other types of information that may be used will be apparent to persons of skill in the art. In this way, the electronic ticket 150 can be uniquely tailored to the individual ticketholder, and can be updated in real time according to criteria or rules that are applied by the server 160.

By using a dynamic ticket, the permissions associated with an attendee or a session can be changed contextually, depending on time, location, or any other factor determined by event organizers. Tickets can be updated in real-time as conditions change. For example, a session might have its capacity increased or decreased based on attendance at a related session that indicates increased or decreased interest in the subject matter of the session. In another example, interest in a session can be estimated by tracking the locations of attendees, for example based on the times when they were known to be at other sessions, and estimating how many attendees will be in the vicinity of session when it begins. The increase or decrease in capacity may be allocated randomly to attendees, or it may be allocated based on any criteria deemed relevant, such as which attendees have or have not attended the related session, any preference indicated by session organizers, or any profile information that correlates with interest in the session.

By using a dynamic ticket, organizers of an event or of individual sessions may, if they choose so, grant services or privileges based on profile information of the users. For example, attending one session might grant permission to attend another session, or to have priority seating in another session. Attendees might be seated in groups in a session, based on profile information. An attendee's session attendance could be tracked for the purpose of awarding credits, for example when an attendee earns professional development credits for attending certain sessions. Attendance in some or all sessions might be tracked and counted as entries in prize draws, or other promotional activities. An attendee might be entitled to a certificate or award for attending a particular number of sessions.

By using a dynamic ticket, an attendee could request, or be given, recommendations about which sessions to attend, based on one or more of: the attendee's profile information, sessions previously attended by the attendee, sessions the attendee is currently permitted to attend, sessions near the attendee's current or last known location, or sessions similar to one at which the attendee has recently been denied access, for example because of lack of capacity.

By using a dynamic ticket, various logistical advantages may be realized by event organizers, such as one or more of: advising attendees of limited remaining capacity in a session, in particular attendees who are nearby to the location of the session or who might be more likely to be interested based on previously attended sessions; delaying the start time of a session based on the number or rate of people attending the session; advising a speaker of a session about the demographic or statistical makeup of the attendees, or specific people of interest who are in attendance; or tracking the flow of people through the event as a whole, which could help to place booths or sessions or other attractions in future events or later days of the same event.

The embodiments described above are intended to be examples only.

The invention claimed is:

1. A method for maintaining a user profile used for authorization by an access terminal to attend one or more sessions of a multi-session event, comprising:

obtaining, from a mobile device, identification information uniquely identifying a user;

obtaining location information of the user;

obtaining time information related to the location information;

updating a user profile of the user based on the identification information, the location information, and the time information; and creating a dynamic electronic ticket using the user profile;

wherein the user's access to one or more sessions of a multi-session event is determined based on the dynamic electronic ticket and other contextual information, authorization of the user to attend the one or more sessions is changeable over time based upon the user's previous use of the dynamic electronic ticket, and the access terminal communicates with the mobile device using a short-range wireless signal between the mobile device and an access terminal corresponding to the session.

2. The method of claim 1, wherein the dynamic electronic ticket is updatable in real-time.

3. The method of claim 1, further comprising determining the user's access to a session based on the user profile, the identification information, the location information, and the time information.

4. The method of claim 3, wherein the location information is based on at least one of:

a location of the mobile device; and a location of a previous session accessed by the user.

5. The method of claim 4, wherein the user profile comprises a history of sessions previously attended by the user.

6. The method of claim 5, wherein the user profile comprises health information of the user.

7. The method of claim 6, further comprising assigning a reward to the user in response to the user accessing or completing one or more sessions of the multi-session event.

8. A system for maintaining a user profile used for authorization by an access terminal to attend one or more sessions of a multi-session event, comprising:

a server configured to:

obtain identification information uniquely identifying a user;

obtain location information of the user;

obtain time information related to the location information;

update a user profile of the user based on the identification information, the location information, and the time information; and create a dynamic electronic ticket using the user profile;

wherein the user's access to one or more sessions of a multi-session event is determined based on the dynamic electronic ticket and other contextual information, authorization of the user to attend the one or more sessions is changeable over time based upon the user's previous use of the dynamic electronic ticket, and the access terminal communicates with the mobile device using a short-range wireless signal between the mobile device and an access terminal corresponding to the session.

9. The system of claim 8, wherein the dynamic electronic ticket is updatable in real-time.

10. The system of claim 9, wherein the server is further configured to determine the user's access to a session based on the user profile, the identification information, the location information, and the time information.

11. The system of claim 10, wherein the location information is based on at least one of:

a location of the mobile device; and a location of a previous session accessed by the user.

12. The system of claim 11, wherein the user profile includes an history of sessions previously attended by the user.

13. The system of claim 12, wherein the user profile includes health information of the user.

14. The system of claim 13, further configured to assign a reward to the user in response to the user accessing or completing one or more sessions of the multi-session event.

15. A method performed by a mobile device for authorization by an access terminal used for accessing one or more sessions of a multi-session event, comprising:

transmitting, by the mobile device, identification information uniquely identifying a user of the mobile device;

transmitting, by the mobile device, location information and time information related to the location information;

storing a dynamic electronic ticket on the mobile device;

communicating a signal representative of a session of the multi-session event; and receiving an indication of the user's access to the session, wherein the user's access to the session is determined using the dynamic electronic ticket and based on the identification information, the location information, the time information, and a profile associated with the user, wherein authorization of the user to attend the one or more sessions is changeable over time based upon the user's previous use of the dynamic electronic ticket, and the access terminal communicates with the mobile device using a short-range wireless signal between the mobile device and an access terminal corresponding to the session.

16. The method of claim 15, further comprising updating the dynamic electronic ticket in real-time according to criteria or rules that are applied by a server.

17. The method of claim 16, wherein the short-range wireless signal is one of a Bluetooth signal, an ultra-wideband (UWB) signal, and a near-field communication (NFC) signal.

18. The method of claim 17, further comprising providing to the user an indication of the user's access to the session.

19. The method of claim 18, wherein said providing of the indication of the user's access to the session comprises displaying to the user the indication of the user's access to the session.

* * * * *